United States Patent [19]

Takida et al.

[11] Patent Number: 5,145,909
[45] Date of Patent: Sep. 8, 1992

[54] HALOGEN-CONTAINING THERMOPLASTIC RESIN COMPOSITION

[75] Inventors: Hiroshi Takida, Takatsuki; Teruo Iwanami, Ibaraki, both of Japan

[73] Assignee: Nippon Gohsei Kagaku Kogyo Kabushiki Kaisha, Osaka, Japan

[21] Appl. No.: 758,395

[22] Filed: Sep. 4, 1991

Related U.S. Application Data

[63] Continuation of Ser. No. 381,558, Jul. 18, 1989, abandoned.

[30] Foreign Application Priority Data

Jul. 19, 1988 [JP] Japan ................... 63-179396

[51] Int. Cl.$^5$ ............................. C08G 63/48
[52] U.S. Cl. ..................... 525/57; 525/58; 525/59; 525/70; 525/79; 525/63; 525/455
[58] Field of Search ......... 525/57, 58, 59, 70, 525/79, 455, 63

[56] References Cited

U.S. PATENT DOCUMENTS 4,041,223  8/1977  Anemiya et al. ............... 525/62
4,672,095  6/1987  Ito et al. ....................... 525/455

FOREIGN PATENT DOCUMENTS 2704424    8/1978   Fed. Rep. of Germany ...... 525/455
3231992    3/1983   Fed. Rep. of Germany ...... 525/455
52-69955   6/1977   Japan .
58-042611  3/1983   Japan ............................... 525/455
59-129214  7/1984   Japan ............................... 525/455
59-217713 12/1984   Japan ............................... 525/455
60-238345 11/1985   Japan .
2107326    4/1983   United Kingdom ............... 525/455

Primary Examiner—James J. Seidleck
Assistant Examiner—W. R. H. Clark
Attorney, Agent, or Firm—Armstrong, Nikaido, Marmelstein, Kubovcik & Murray

[57] ABSTRACT

This invention provides a halogen-containing thermoplastic resin composition comprising a halogen-containing thermoplastic resin (A) consisting of 100 to 0.1 weight percent of a thermoplastic polyurethane-vinyl chloride graft polymer (a1) with a polyurethane content of 10 to 90 weight percent which is produced by polymerizing vinyl chloride in the presence of a thermoplastic polyurethane and 0 to 99.9 weight percent of another halogen-containing polymer (a2) and a melt-moldable vinyl alcohol polymer (B), the proportion of melt-moldable vinyl alcohol polymer (B) being in the range of 0.1 to 100 parts by weight to 100 parts by weight of halogen-containing thermoplastic resin (A).

1 Claim, No Drawings

HALOGEN-CONTAINING THERMOPLASTIC RESIN COMPOSITION

This application is a continuation of application Ser. No. 381,558 filed Jul. 18, 1989, now abandoned.

BACKGROUND OF THE INVENTION

This invention relates to a halogen-containing thermoplastic resin composition excelling in processability, appearance, strength, hydrophilicity, resistance to oil and solvents and gas barrier property.

Halogen-containing thermoplastic resins, represented by polyvinyl chloride, are not only comparatively inexpensive but also have excellent clarity and mechanical properties and have therefore been used in a variety of applications, such as film, sheet, hose, flexible containers, coated fabric, artificial leather, tarpaulin, shoe bottom, sponge, electrical wire sheathing, living necessaries and so on.

Having the above-mentioned advantages on the one hand, halogen-containing thermoplastic resins are disadvantages, on the other hand, in that they are not satisfactory in processability, hydrophilicity, resistance to oil and solvents, gas barrier property and adhesiveness to substrates.

In order to improve the processability, hydrophilicity and other properties of halogen-containing thermoplastic resins, it has been practiced to polymer-blend these resins with a modifying resin such as a hydrolyzed ethylene-vinyl acetate copolymer.

By way of example, Japanese Patent Application KOKAI No. 69955/1977 discloses a polyvinyl chloride barrier packaging composition essentially comprising a mixture of a vinyl chloride polymer and an ethylene-vinyl alcohol copolymer, the proportion of which is 10 to 30 weight percent based on the vinyl chloride polymer.

Japanese Patent Application KOKAI No. 238345/1985 describes a resin composition comprising (a) a thermoplastic resin (including polyvinyl chloride), (b) a hydrolyzed ethylene-vinyl acetate copolymer, and (c) a salt or an oxide containing at least one element selected from the group consisting of the elements of Groups I, II and III of Periodic Tables of the Elements and mentions that this composition has remarkably improved compatibility.

However, although the addition of a hydrolyzed ethylene-vinyl acetate copolymer to a halogen-containing thermoplastic resin results in improvements in hydrophilicity, resistance to oil and solvents and gas barrier property, the inherent poor compatibility of the two resins makes long-run molding difficult and, moreover, the products obtainable therefrom by melt-molding have foreign matter and discoloration problems and poor mechanical properties.

The composition according to Japanese Patent Application KOKAI No. 238345/1985 referred to above has improved compatibility but the degree of improvement by addition of salt or oxide has its own limit and it still has much room for improvement.

The object of this invention is to solve the above-mentioned problems by employing a specific vinyl chloride graft polymer in adding a vinyl alcohol polymer to a halogen-containing thermoplastic resin for improving its properties.

SUMMARY OF THE INVENTION

This invention is therefore directed to a halogen-containing thermoplastic resin composition comprising a halogen-containing thermoplastic resin (A) consisting of 100 to 0.1 weight percent of a thermoplastic polyurethane-vinyl chloride graft polymer (a1) with a polyurethane content of 10 to 90 weight percent and 0 to 99.9 weight percent of another halogen-containing polymer (a2) and a melt-moldable vinyl alcohol polymer (B), the proportion of (B) being in the range of 0.1 to 100 parts by weight to 100 parts by weight of (A).

DETAILED DESCRIPTION OF THE INVENTION

This invention is described in further detail hereinafter.

Halogen-containing thermoplastic resin (A)

The halogen-containing thermoplastic resin (A) is either a thermoplastic polyurethane-vinyl chloride graft polymer (a1) or a mixture of said graft polymer (a1) and one or more other halogen-containing polymers (a2).

Thermoplastic polyurethane-vinyl chloride graft polymer (a1)

The thermoplastic polyurethane-vinyl chloride graft polymer (a1) is a resin obtained by polymerizing vinyl chloride in the presence of a thermoplastic polyurethane.

This graft polymer can be prepared by the method used in the polymerization of vinyl chloride. Typically, the thermoplastic polyurethane and a polymerization initiator are dissolved in vinyl chloride and after the solution is dispersed in aqueous medium with a dispersing agent if necessary, the reaction is carried out under the conditions of suspension polymerization of vinyl chloride.

As the suspension stabilizer, a partially hydrolyzed polyvinyl alcohol, gelatin, cellulose ether, vinyl acetate-maleic anhydride copolymer, styrenemaleic anhydride copolymer, polyethylene glycol or the like is employed and as the polymerization initiator; an azo compound, a peroxide, or the like is employed.

The proportion of the polyurethane component of the resulting graft polymer should be in the range of 10 to 90 weight percent. If the proportion of the polyurethane component is less than the above range, the compatibility-improving effect of this invention will not be fully accomplished.

The thermoplastic polyurethane can be prepared by reacting a long-chain diol such as a polyester diol or a polyether diol with an aliphatic or alicyclic diisocyanate such as tetramethylene diisocyanate, pentamethylene diisocyanate, hexamethylene diisocyanate, lysine diisocyanate, cyclohexylmethane diisocyante, 2,2,4- or 2,4,4-trimethylhexamethylene diisocyanate, isopropylidenebis(4-cyclohexyl isocyanate), methylcyclohexane diisocyanate, isophorone diisocyanate or the like.

Of the polyester diol and the polyether diol, the former is the more desirable. As examples of the polyester diol, there may be mentioned the diols obtainable by reacting a dicarboxylic acid (e.g. adipic acid, azelaic acid, pimelic acid, sebacic acid, dodecanediodic acid, etc.) or a lower alkyl ester thereof with a linear aliphatic diol containing 4 to 12 carbon atoms (e.g. 1,4-butanediol, 1,6-hexanediol, 1,10-decamethylene glycol, etc.) or a branched aliphatic diol having 3 to 12 carbon atoms (e.g. 1,2-propylene glycol, 1,3-butylene glycol, 2,5-dimethyl-2,5-hexanediol, 2,2-diethyl-1,3-propanediol, neopentyl glycol, etc.).

Halogen-containing polymer (a2) other than graft polymer (a1)

As examples of the halogen-containing polymer (a2) other than said graft polymer (a1), there may be mentioned polyvinyl chloride, polyvinylidene chloride, chlorinated polyethylene, chlorinated polypropylene, ethylene chloride-vinyl acetate copolymer, chlorosulfonated polyethylene and so on. Particularly desirable are polyvinyl chloride resins, i.e. homopolymer of vinyl chloride and copolymers of vinyl chloride with other comonomers.

Vinyl alcohol polymer (B)

The vinyl alcohol polymer (b) includes, among others, melt-moldably vinyl alcohol homopolymers and copolymers, such as polyvinyl alcohols of comparatively low degrees of polymerization, partial hydrolyzates of polyvinyl acetate, post-modification (acetalized, ketalized and cyanoetherized) products of polyvinyl alcohols, and hydrolyzed copolymers of vinyl acetate with copolymerizable monomers (for example, olefins, such as ethylene, propylene, α-octene and α-dodecene, unsaturated carboxylic acids, their salts, partial or complete esters, nitrils, amides and anhydrides, unsaturated sulfonic acids and their salts, and vinyl esters other than vinyl acetate). It should be understood, however, that the proportion of the monomer or monomers copolymerizable with vinyl acetate should not be more than 30 mole percent, except that, in the case of ethylene, its proportion should not exceed 75 mole percent.

Among the above-mentioned polymers, a hydrolyzed ethylene-vinyl acetate copolymer with an ethylene content of 20 to 75 mole percent (preferably 25 to 60 mole percent) and a degree of saponification of vinyl acetate being not less than 50 mole percent (preferably not less than 70 mole percent) is the most useful. The vinyl alcohol polymers outside the above copolymer composition are inadequate in the potential to improve the properties of halogen-containing thermoplastic resin (A). It should also be understood that as long as the above-mentioned range of copolymer composition is met with, the vinyl alcohol polymer (B) may contain other comonomers in minor proportions.

Among those vinyl alcohol polymers (B), a low-ash, low-alkali metal vinyl alcohol polymer with a melting point not exceeding 200° C. and ash and alkali metal contents not exceeding certain limits is particularly useful.

Since the halogen-containing thermoplastic resin (A) is generally molded at a temperature not higher than 200° C., any vinyl alcohol polymer (B) with a melting point exceeding 200° C. will not be completely dispersed in (A) and, hence, the physical properties of the resulting product may not be fully satisfactory.

Moreover, if the ash content and alkali metal content of (B) exceed a certain limit, the halogen-containing thermoplastic resin (A) and the polyesteramide (C) to be described below are liable to undergo discoloration and decomposition.

The hydrolyzed vinyl acetate copolymer can generally be prepared by hydrolyzing (saponifying) a vinyl acetate copolymer with the aid of an alkali catalyst. However, the industrial water and reagents used generally contain metal salts as impurities and the saponification catalyst (an alkali metal hydroxide) remains as the alkali metal acetate after the reaction, with the result that such impurities and alkali metal acetate tend to be contained in the saponified polymer separated by precipitation and filtration from the saponification reaction mixture. Though it depends on various factors such as the comonomer content of the resin, degree of saponification, conditions of saponification reaction, etc., the ash and alkali metal contents of the hydrolyzed vinyl acetate copolymer so obtained are usually about 5,000 to 50,000 ppm and about 4,000 to 40,000 ppm, respectively.

In the production of polyvinyl alcohol or postmodification product of polyvinyl alcohol, an acid or an alkali is used as catalysts of hydrolysis reaction. In the case of an acid catalyst, metal hydroxide or carbonate is employed in neutralization process after hydrolysis, so the substantial amount of alkali metal is also included in the products.

The terms 'ash content' are used herein to mean the value found as follows. The hydrolyzed vinyl acetate copolymer is dried, taken in a platinum evaporation dish and carbonized by means of an electric heater and a gas burner. The carbonized resin is then charged into an electric furnace at 400° C. The furnace is then heated-up to 700° C., at which temperature it is thoroughly reduced to ashes in 3 hours. The ashes are taken out from the furnace, allowed to cool in 5 minutes and further allowed to stand in a desiccator for 25 minutes. Finally, the ashes were accurately weighed.

The terms 'alkali metal content' are used herein to mean the value found as follows. After the hydrolyzed vinyl acetate copolymer is reduced to ashes as in the determination of ash content, the ashes are dissolved in an aqueous solution of hydrogen chloride under warming and the solution is subjected to atomic absorption spectrometry.

The vinyl alcohol polymer, particularly the hydrolyzed ethylene-vinyl acetate copolymer, to be used in accordance with the invention preferably has an ash content, as determined by the above procedure, not more than 300 ppm, more desirably not more than 50 ppm, and for still better results not more than 20 ppm and an alkali metal content, also as determined by the above-described procedure, not more than 200 ppm, more desirably not more than 35 ppm, and for still better results not more than 5 ppm. The ash and alkali metal contents are preferably as low as possible within the respective ranges mentioned above but because of various limitations imposed on purification in commercial production, the practical lower limits are about 1 ppm for ashes and about 0.5 ppm for alkali metal.

The aforementioned ash- and alkali metal-lean vinyl alcohol polymer can be prepared as follows. The powders, granules or pellets of vinyl alcohol polymer obtained are washed thoroughly with an aqueous or organic solvent (e.g. methanol) solution of acid, preferably a weak acid, to remove the salt responsible for said ashes and alkali metal and are then preferably washed with water or organic solvent such as methanol to remove the absorbed acid from the resin and dried.

Incidentally, the water to be used in the preparation of aqueous solutions or in the washing procedure is deionized water and the same applies to the following description.

As examples of the weak acid mentioned above, there may be mentioned acetic acid, propionic acid, glycolic acid, lactic acid, adipic acid, azelaic acid, glutaric acid, succinic acid, benzoic acid, isophthalic acid, terephthalic acid and so on. Generally, a weak acid with a pKa value not less than 3.5 at 25° C. is preferred.

After the above weak acid treatment and either before or after washing with a water or organic solvent, there is preferably carried out a further treatment with a dilute aqueous or organic solvent (e.g. methanol) solution of strong acid, for example an organic acid with a pKa value not exceeding 2.5 at 25° C., such as oxalic acid, maleic acid, etc., or mineral acids such as phosphoric acid, sulfuric acid, nitric acid, hydrochloric acid and so on. By this strong acid treatment, removal of the alkali metal can be made more effectively.

Formulation

The proportion of said thermoplastic polyurethane-vinyl chloride graft copolymer (a1) in said halogen-containing thermoplastic resin (A) must be within the range of 0.1 to 100 weight percent, with the balance being accounted for by the halogen-containing polymer (a2) such as ordinary vinyl chloride polymer. If the proportion of the graft polymer (a1) is less than 0.1%, the compatibility with the vinyl alcohol polymer (B) will be inadequate, with the result that the appearance and physical properties of moldings will be adversely affected.

The proportion of the vinyl alcohol polymer (B) to each 100 parts by weight of the halogen-containing thermoplastic resin consisting of said graft polymer (a1) and other halogen-containing polymer (a2) is selected within the range of 0.1 to 100 parts by weight. The preferred range is 0.5 to 50 parts by weight.

If the proportion of vinyl alcohol polymer (B) is too small, the improving effect on the properties of halogen-containing thermoplastic resin (A) will not be sufficient, while the use of vinyl alcohol polymer (B) in excess of the above-mentioned range will detract from the inherent useful properties of halogen-containing thermoplastic resin (A).

Other additives

The halogen-containing thermoplastic resin composition of this invention may include, in addition to the above-described components, other additives which are conventionally used for halogen-containing thermoplastic resin, such as plasticizers, antioxidants, stabilizers, auxiliary stabilizers, ultraviolet absorbers, dyes and pigments, fillers, lubricants, antistatic agents, surfactants, chelating agents, reinforcing materials, foaming agents, flame retardants, impact resistance improving agents and so on. Furthermore, unless the object and effect of this invention are not jeopardized, other kinds of thermoplastic resins can also be incorporated.

Compounding sequence

The thermoplastic polyurethane-vinyl chloride graft polymer (a1) and other halogen-containing polymer (a2), vinyl alcohol polymer (B) and any other additives can be compounded simultaneously or in an optional order and the resulting compound is subjected to melt-molding.

Melt-molding

As the melt-molding techniques that can be employed, any of calendering, extrusion molding, injection molding and blow molding methods can be employed.

EFFECTS OF THE INVENTION

In the melt-molding of a polymer blend consisting of halogen-containing thermoplastic resin (A) and vinyl alcohol polymer (B), the use of a certain thermoplastic polyurethane-vinyl chloride graft polymer (a1) as part of said halogen-containing thermoplastic resin (A) in accordance with this invention results in an effective improvement in compatibility between (A) and (B), so moldability is improved and improving effect of (B) on the properties of (A) is remarkably realized.

Therefore, in calendering, the problem of "plate-out" is eliminated, while extrusion molding can be continuously carried out over a long run. Moreover, the discoloration of moldings is effectively retarded and the appearance and physical properties of moldings are remarkably improved.

EXAMPLES

The following examples are further illustrative of this invention. In the examples, all parts and percents (%) are by weight unless otherwise indicated.

Provision of materials

As the halogen-containing thermoplastic resin (A) and vinyl alcohol polymer (B), the following materials were provided.

Halogen-containing thermoplastic resin (A)

Graft polymer (a1)

(a1-1)

A thermoplastic polyurethane was prepared by a reaction of hexamethylene diisocyanate and polyester (derived from adipic acid and 1,4-butanediol/neopentyl glycol (mole ratio: 9/1)) having terminal OH-groups and molecular weight of 2,000.

In a autoclave were fed with 100 parts of the above-mentioned thermoplastic polyurethane, 270 parts of vinyl chloride, 350 parts of water, 0.3 parts of α,α-azobisisobutyronitrile and 0.5 parts of polyvinyl alcohol. The mixture was stirred for 3 hours at a room temperature to dissolve, and then, suspension-polymerization was conducted for 15 hours at 60° C. The reaction product was filtered, washed with water and dried under vacuum at 40° C. It was obtained 333 parts of a thermoplastic polyurethane-vinyl chloride graft polymer with a polyurethane content of 30% and brittling temperature of −40° C.

(a1-2)

Suspension-polymerization was conducted in the same manner as (a1-1) except that 80 parts of vinyl chloride was used. The reaction product was filtered, washed with water and dried under vacuum at 40° C. It was obtained 167 parts of a thermoplastic polyurethane-vinyl chloride graft polymer with a polyurethane content of 60% and brittling temperature of not more than −70° C.

Other halogen-containing polymer (a2)

(a2-1)

Polyvinyl chloride (degree of polymerization: 800)

(a2-2)

Methyl acrylate-vinylidene chloride copolymer (methyl acrylate: 7 mole %)

Vinyl alcohol polymer (B)

B-1)

Hydrolyzed ethylene-vinyl acetate copolymer (ethylene content 44 mole %, degree of saponification of vinyl acetate 99.5 mole %, m.p. 167° C., ash content 6 ppm, sodium metal content 2.7 ppm)

B-2)

Hydrolyzed ethylene-vinyl acetate copolymer (ethylene content 55 mole %, degree of saponification of vinyl acetate 79.0 mole %, m.p. 111° C., ash content 15 ppm, sodium metal content 4.0 ppm)

(B-3)

Hydrolyzed dodecene-1-vinyl acetate copolymer (dodecene-1 content 5.5 mole %, degree of saponification of vinyl acetate 99.3 mole %, m.p. 187° C., ash content 215 ppm, sodium metal content 140 ppm) cl (B-4)

Polyvinyl alcohol (degree of polymerization 500, degree of saponification 70.0 mole %, m.p. 170° C., ash content 120 ppm, sodium metal content 70 ppm)

Formulation and molding conditions

Using the above materials in the proportions indicated in Table 1, preliminary compounding was carried out and, then, the respective compounds were extrusion-molded under the conditions described hereinafter.

In the case where halogen-containing thermoplastic resin (a2) was polyvinyl chloride, the compounding formula and molding conditions were set as follows.

| (Compounding formula) | |
|---|---|
| Graft polymer (a1) | As indicated |
| Polyvinyl chloride (a2) | As indicated |
| (100 parts for (a1) and (a2) combined) | |
| Vinyl alcohol polymer (B) | As indicated |
| Epoxidized soybean oil | 3 Parts |
| Calcium stearate | 0.5 Part |
| Zinc stearate | 0.5 Part |
| Stearoylbenzoylmethane | 0.2 Part |

Extrusion molding conditions

Extruder: a 30 mm (dia.) extruding machine
T die: 200 mm wide, sheet thickness 0.3 mm
Screw: Full-flighted, constant pitch, L/D=20, compression ratio 3.0, rotational speed 30 rpm.
Temperature: C1: 130° C., C2: 175° C., C3: 180° C. H: 170° C., D: 180° C.
Screen: 80 mesh×2
Take-off roll: 85°–90° C.

When the halogen-containing thermoplastic resin (a2) is a vinylidene chloride-methyl acrylate copolymer, the compounding formula and extrusion molding conditions were set as follows.

| (Compounding formula) | |
|---|---|
| Graft polymer (a1) | As indicated |
| Vinylidene chloride-methyl acrylate copolymer (a2) | As indicated |
| (100 parts for (a1) and (a2) combined) | |
| Vinyl alcohol polymer (B) | As indicated |
| Epoxidized soybean oil | 3 Parts |
| Calcium stearate | 0.5 Part |
| Zinc stearate | 0.5 Part |
| Stearoylbenzoylmethane | 0.2 Part |

Molding conditions

Extruder: a 40 mm (dia.) extruding machine
Die temperature: 170° C.
The other conditions are same as above-mentioned.

Conditions and results

The conditions and results are shown in Table 1. The determination and evaluation were made as follows.

The extrusion-moldability was evaluated in terms of draw-down, change in torque and other abnormalities during 8-hour continuous molding.

The appearance of molded testpieces were evaluated after 8-hour continuous molding in terms of discoloration, fisheyes (FE), streaks and so on.

The total light transmittance was measured in accordance with JIS K 6745 (1 mm-thick sheet).

As to impact strength, Izod impact strength was measured in accordance with JIS K 7110. In the table, "not destroyed" means that 10 specimens were invariably not destroyed and >80, >71 and >60 means that the minimum values for 10 specimens were 80, 71 and 60, respectively.

The discharge half-time was measured with an honestmeter. With the halogen-containing thermoplastic resin (A) alone, the discharge half-time was ∞ for any of (a1-1), (a1-2), (a2-1) and (a2-2) or any mixture thereof.

TABLE 1

| | Compounding formula Component/parts | | Molding trouble | Appearance of product | | Total light transmittance (%) | Impact strength (kg · cm/cm$^2$) | Discharge half-time (sec.) |
|---|---|---|---|---|---|---|---|---|
| Example 1 | a-1 | 100 | No trouble | Coloration | None | 86 | Not destroyed | 55 |
| | B-1 | 10 | | FE | None | | | |
| | | | | Streaks | None | | | |
| Example 2 | a1-1 | 100 | No trouble | Coloration | None | 88 | Not destroyed | 60 |
| | B-2 | 10 | | FE | None | | | |
| | | | | Streaks | None | | | |
| Example 3 | a1-1 | 30 | No trouble | Coloration | None | 82 | >80 | 26 |
| | a2-1 | 70 | | FE | None | | | |
| | B-1 | 20 | | Streaks | None | | | |
| Example 4 | a1-1 | 20 | No trouble | Coloration | None | 83 | >71 | 28 |
| | a2-1 | 80 | | FE | None | | | |
| | B-2 | 20 | | Streaks | None | | | |
| Example 5 | a1-1 | 30 | No trouble | Coloration | None | 79 | >60 | 17 |
| | a2-1 | 70 | | FE | None | | | |
| | B-3 | 10 | | Streaks | None | | | |
| Example 6 | a1-2 | 100 | No trouble | Coloration | None | 89 | Not destroyed | 50 |

TABLE 1-continued

| | Compounding formula Component/parts | | Molding trouble | Appearance of product | | Properties of product | | |
|---|---|---|---|---|---|---|---|---|
| | | | | | | Total light transmittance (%) | Impact strength (kg·cm/cm$^2$) | Discharge half-time (sec.) |
| | B-1 | 10 | | FE | None | | | |
| | | | | Streaks | None | | | |
| Example 7 | a1-2 | 100 | No trouble | Coloration | None | 82 | Not destroyed | 65 |
| | B-3 | 5 | | FE | None | | | |
| | | | | Streaks | None | | | |
| Example 8 | a1-2 | 70 | No trouble | Coloration | None | 81 | Not destroyed | 21 |
| | a2-1 | 30 | | FE | None | | | |
| | B-4 | 5 | | Streaks | None | | | |
| Example 9 | a1-2 | 80 | No trouble | Coloration | None | 80 | Not destroyed | 20 |
| | a2-2 | 20 | | FE | None | | | |
| | B-4 | 5 | | Streaks | None | | | |

What is claimed is:

1. A thermoplastic resin blend comprising a halogen-containing thermoplastic resin (A) consisting of 100 to 0.1 weight percent of a thermoplastic polyurethane-vinyl chloride graft polymer (a1) with polyurethane content of 10 to 90 weight percent which is produced by polymerizing vinyl chloride in the presence of a thermoplastic polyurethane, and 0 to 99.9 weight percent of another halogen-containing polymer (a2) and a low-ash alkali metal hydrolyzed ethylene-vinyl acetate copolymer with an ethylene content of 20 to 75 mole percent, a degrees of saponification of vinyl acetate not less than 50 mole percent, a melting point not exceeding 200° C., an ash content not exceeding 300 ppm and an alkali metal content not exceeding 200 pm (B), the proportion of said hydrolyzed ethylene-vinyl acetate copolymer (B) being in the range of 0.1 to 100 parts by weight to 100 parts by weight of said halogen-containing thermoplastic resin (A).

* * * * *